(12) United States Patent
Oh

(10) Patent No.: US 7,648,168 B2
(45) Date of Patent: Jan. 19, 2010

(54) COLLISION ENERGY ABSORBABLE STEERING COLUMN OF VEHICLE EQUIPPED WITH WIRE BLOCK ASSEMBLY

(75) Inventor: Jae-Moon Oh, Gongju (KR)

(73) Assignee: Mando Corporation (KR)

( * ) Notice: Subject to any disclaimer, the term of this patent is extended or adjusted under 35 U.S.C. 154(b) by 172 days.

(21) Appl. No.: 12/009,158

(22) Filed: Jan. 16, 2008

(65) Prior Publication Data

US 2008/0174096 A1 Jul. 24, 2008

(30) Foreign Application Priority Data

Jan. 19, 2007 (KR) ............... 10-2007-0005941

(51) Int. Cl.
*B62D 1/19* (2006.01)

(52) U.S. Cl. ...................... 280/777; 74/493

(58) Field of Classification Search ............... 280/775, 280/777; 74/493; *B62D 1/19*
See application file for complete search history.

(56) References Cited

U.S. PATENT DOCUMENTS

| | | | | |
|---|---|---|---|---|
| 5,609,364 | A * | 3/1997 | Fouquet et al. | 280/777 |
| 5,961,146 | A * | 10/1999 | Matsumoto et al. | 280/777 |
| 6,224,104 | B1 * | 5/2001 | Hibino | 280/777 |
| 6,264,240 | B1 * | 7/2001 | Hancock | 280/777 |
| 6,478,333 | B1 * | 11/2002 | Barton et al. | 280/777 |
| 7,441,808 | B2 * | 10/2008 | Eggers et al. | 280/777 |
| 2006/0163862 | A1 * | 7/2006 | Satou et al. | 280/777 |
| 2008/0084055 | A1 * | 4/2008 | Cymbal et al. | 280/777 |

FOREIGN PATENT DOCUMENTS

| | | |
|---|---|---|
| DE | 694 01 587 | 6/1994 |
| DE | 100 25 981 | 5/2000 |
| KR | 10-2007-0005977 | 1/2007 |

* cited by examiner

*Primary Examiner*—Ruth Ilan
(74) *Attorney, Agent, or Firm*—Harness, Dickey & Pierce, P.L.C.

(57) ABSTRACT

Disclosed is a collision energy absorbable steering column of a vehicle, which includes a steering shaft having an upper end connected to a steering wheel and a lower end connected to a rack-pinion mechanism; an interior tube for surrounding the steering shaft; an exterior tube for surrounding the interior tube; a wire block assembly fixed to a mounting bracket so as to absorb collision energy by wire deformation when a vehicle crashes against an object; the mounting bracket for supporting the exterior tube, the mounting bracket being fixed to a chassis of the vehicle, the mounting bracket having at least one side rail and at least one wire-assembling hole through which a wire is inserted so as to assemble the mounting bracket with the wire block assembly; and a plate bracket coupled to the mounting bracket by forcibly fitting the plate bracket together with the wire block assembly in the mounting bracket.

2 Claims, 4 Drawing Sheets

COLLISION ENERGY ABSORBABLE STEERING COLUMN OF VEHICLE EQUIPPED WITH WIRE BLOCK ASSEMBLY

CROSS-REFERENCE TO RELATED APPLICATION

This non-provisional application claims priority under 35 U.S.C § 119(a) on Patent Application No. 10-2007-0005941 filed in Korea on Jan. 19, 2007, the entire contents of which are hereby incorporated by reference.

BACKGROUND OF THE INVENTION

1. Field of the Invention

The present invention relates to a collision energy absorbable steering column of a vehicle, and more particularly to a collision energy absorbable steering column of a vehicle, which includes a wire block assembly that is fixed to a mounting bracket and that can absorb collision energy by wire deformation when a vehicle crashes against an object.

2. Description of the Prior Art

In general, a steering column refers to an apparatus, which encloses and supports a steering shaft that delivers rotatory force generated by a steering wheel operation of a driver to a rack-pinion mechanism, and is fixed to a chassis of a vehicle through a bracket, so as to fix a position of the steering shaft.

When a vehicle crashes against an object, the upper part of the driver's body hits against the steering wheel and is wounded. In order to prevent this, a collision energy absorbing steering column having a newly added collapse function that allows both the steering column and the steering shaft to be contracted in its shaft direction has been employed as a steering column. That is, when a driver is involved in a crashing accident during the driving, the upper part of the driver's body hits against the steering wheel due to inertia. When the upper part of the driver's body hits against the steering column, the steering column and the steering shaft provided on the lower part of the steering wheel are contracted so as to reduce the impact applied to the driver.

However, the collision energy transferred to the steering wheel due to the collision between the steering wheel and the driver depends on a driver state and a vehicle state. For example, large collision energy is transferred when the vehicle has a high speed, while small collision energy is transferred when the vehicle has a low speed. Further, the amount of collision energy applied to the steering wheel depends on several conditions such as the wearing of driver's seat belt, operation of an air bag, etc. A steering apparatus equipped with a tearing plate has been developed to cope with these conditions.

FIG. 1 is a side view showing a collision energy absorbable steering column of a vehicle according to the prior art. FIG. 2 is a perspective view showing a tearing plate of the collision energy absorbable steering column of the vehicle according to the prior art.

As shown in the drawings, the collision energy absorbable steering column of the vehicle 100 according to the prior art includes a steering shaft 102, an interior tube 110, an exterior tube 120, a mounting bracket 130, and a tearing plate 170. The steering shaft 102 has an upper end connected to a steering wheel (not shown), and a lower end connected to a rack-pinion mechanism (not shown). The interior tube 110 surrounds the steering shaft 102, and the exterior tube 120 surrounds the interior tube 110. The mounting bracket 130 is coupled to a chassis 104 through a capsule 140 while supporting an outer peripheral surface of the exterior tube 120.

The tearing plate 170 has one end fixed to the capsule 140 by a fixing means 150 and the other end fixed to the mounting bracket 130 through a fixing member 160.

When the upper part of driver's body collides with the steering wheel due to a frontal crashing of a vehicle, the steering column 100 is contracted in the direction (i.e. a collision energy transfer direction or a collapse direction) in which the impact has been applied to the steering wheel. Then, the mounting bracket 130 moves together with the exterior tube 120 in the collapse direction from the capsule 140 fixed on the chassis 104. That is, when the collision occurs, the mounting bracket 130 is separated from the capsule 140, is easily released from the chassis 104, and then moves in the collapse direction (i.e. in the collision energy transfer direction), while the steering column 100 is contracted.

The tearing plate 170 of the collision energy absorbing steering column according to the prior art has a fixing hole 202 formed through a top portion of one side of the tearing plate 170 and an assembling hole 204 formed through another portion thereof. The tearing plate 170 is assembled with the mounting bracket 130 by a fixing member 160 fitted in the fixing hole 202, and is assembled with the capsule 140 by the fixing means 150 fitted in the assembling hole 204. The tearing plate 170 is provided with a tearing groove 210 with a uniform depth.

According to the contraction of the steering column, the mounting bracket 130 moves against the capsule 140, and the mounting bracket 130 moves downward. Then, force from the capsule 140 and force from the mounting bracket 130 are applied to the tearing plate 170 in opposite directions. As a result, the tearing plate 170 is torn along the tearing groove 210 formed on the tearing plate 170 according to the movement of the mounting bracket 130 while absorbing the collision energy. That is, the fixing member 160 formed on the mounting bracket 130 absorbs the collision energy while deforming the tearing plate 170.

However, in the case of absorbing the collision energy by the breaking of the tearing plate along the tearing groove 210 having a uniform depth as described above, it is impossible to cope with various quantities of impact according to various situations and impossible to control the magnitude of an initial load against impact. Moreover, the deformation occurs only in a perpendicular direction and may cause interference between the torn part and surrounding objects, which may cause biased deformation or biased damage.

SUMMARY OF THE INVENTION

Accordingly, the present invention has been made to solve the above-mentioned problems occurring in the prior art, and the present invention provides a collision energy absorbable steering column of a vehicle, which can absorb the collision energy by wire deformation when the vehicle crashes against an object, and can easily control an initial load through adjustment of the wire thickness, which results in reduction of cost. Moreover, the present invention provides a collision energy absorbing steering column, in which the deformation occurs in a direction parallel to the impact transfer direction, so as to reduce biased deformation or biased damage due to interference between a deformed part and surrounding objects.

In accordance with an aspect of the present invention, there is provided a collision energy absorbable steering column of a vehicle including: a steering shaft having an upper end connected to a steering wheel and a lower end connected to a rack-pinion mechanism; an interior tube for surrounding the steering shaft; an exterior tube for surrounding the interior tube; a wire block assembly fixed to a mounting bracket so as to absorb collision energy by wire deformation when a vehicle crashes against an object; the mounting bracket for supporting the exterior tube, the mounting bracket being fixed to a chassis of the vehicle, the mounting bracket having at least one side rail and at least one wire-assembling hole through which a wire is inserted so as to assemble the mounting bracket with the wire block assembly; and a plate bracket coupled to the mounting bracket by forcibly fitting the plate bracket together with the wire block assembly in the mounting bracket.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
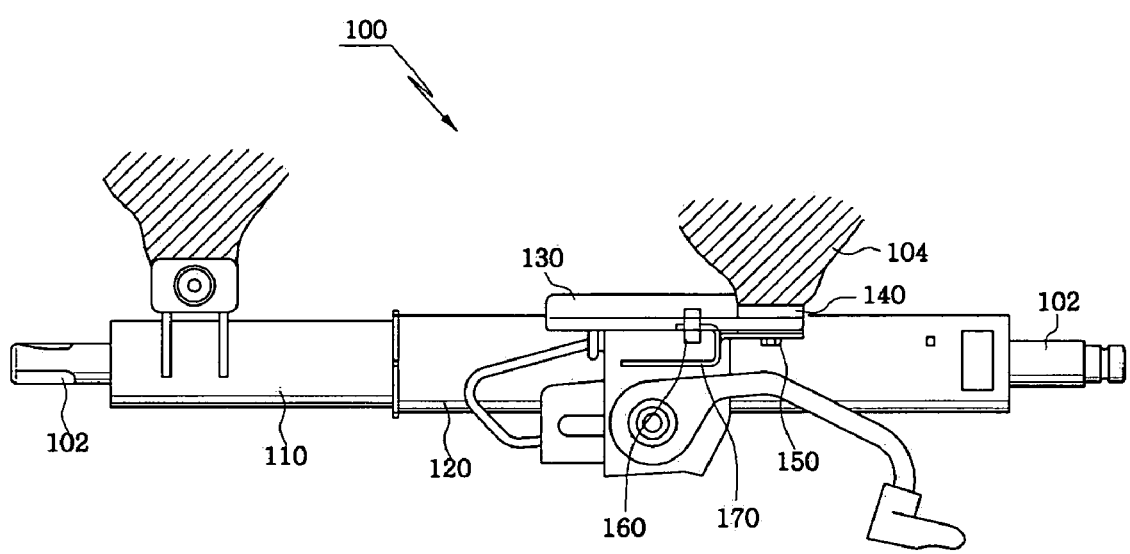
FIG. 1 is a side view showing a collision energy absorbable steering column of a vehicle according to the prior art.
Figure 2:
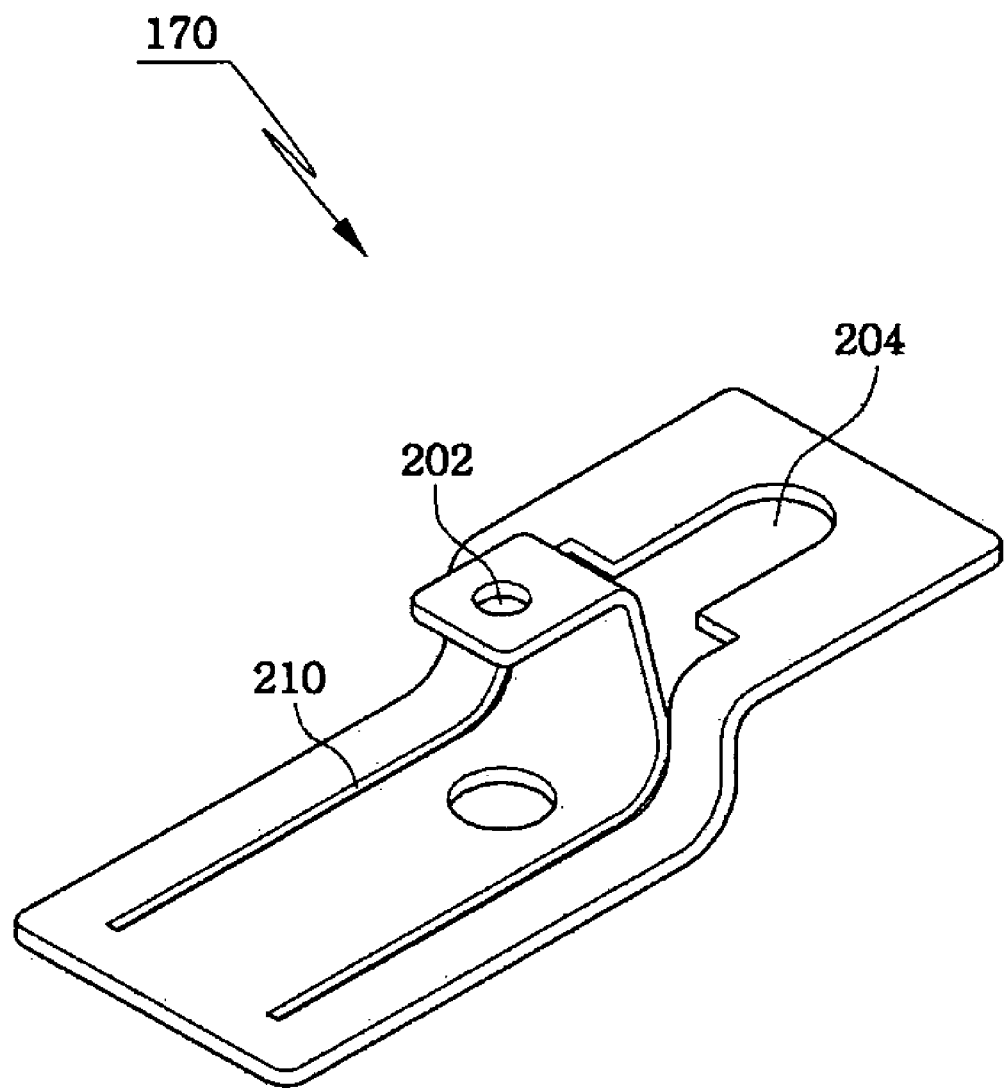
FIG. 2 is a perspective view showing a tearing plate of the collision energy absorbable steering column of the vehicle according to the prior art.

Hereinafter, an exemplary embodiment of the present invention will be described with reference to the accompanying drawings. In the following description and drawings, the same reference numerals are used to designate the same or similar components, and so repetition of the description on the same or similar components will be omitted.

Figure 3A:
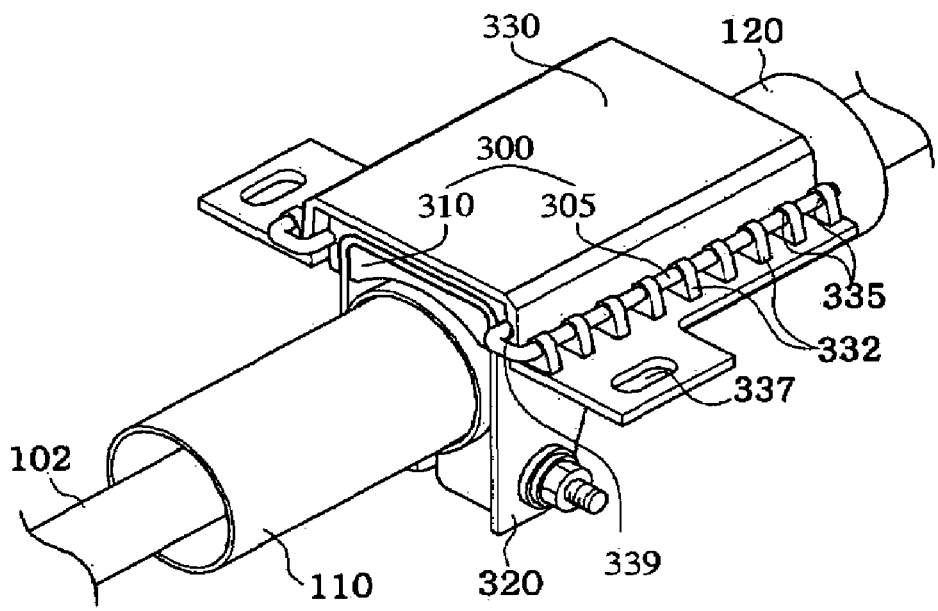
FIG. 3A is a perspective view showing a collision energy absorbable steering column of a vehicle equipped with a wire block assembly according to an embodiment of the present invention.
Figure 3B:
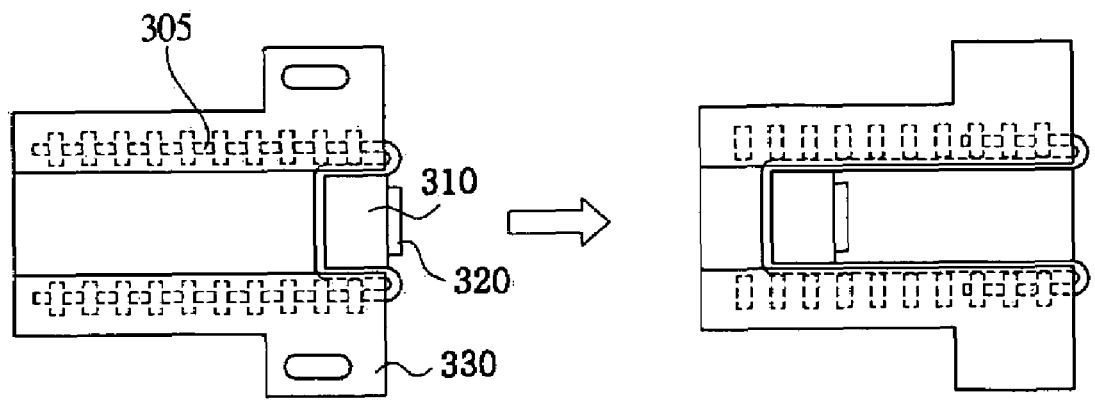
FIG. 3B is a plan view showing a process in which a wire block assembly according to the embodiment of the present invention is deformed by impact.

FIG. 3A is a perspective view of a collision energy absorbable steering column of a vehicle according to an embodiment of the present invention. FIG. 3B is a plan view showing a process in which the wire block assembly according to the embodiment of the present invention is deformed due to collision energy.

As shown in the drawings, the collision energy absorbable steering column of the vehicle according to the present invention includes a steering shaft 102, an interior tube 110, an exterior tube 120, a wire block assembly 300, a mounting bracket 330, and a plate bracket 320. Herein, the steering shaft 102 has an upper end connected to a steering wheel (not shown) and a lower end connected to a rack-pinion mechanism (not shown). Herein, the interior tube 110 protects the steering shaft and the exterior tube 120 protects the interior tube. Herein, the wire block assembly 300 is fixed to the mounting bracket 330, and absorbs collision energy by the deformation of the wire 305 when a vehicle crashes against an object. Herein, the mounting bracket 330 supports the exterior tube and is fixed to the chassis, and the mounting bracket 330 has at least one wire-assembling hole 335 penetrated by the wire 305 and at least one side rail 339 so as to be assembled with the wire block assembly 300. Herein, the plate bracket 320 together with the wire block assembly 300 is forcedly inserted and fitted in the mounting bracket 330.

The mounting bracket 330 has a fixing hole 337 in which a fixing member (not shown) is fitted so as to fix the mounting bracket 330 to the chassis. Further, the mounting bracket 330 includes a plurality of ribs 332 arranged along the corner between the surface through which the fixing hole 337 is formed and a surface perpendicular to the surface of the fixing hole 337. Each of the rib 332 is provided with a wire-assembling hole 335 through which a wire extends. Therefore, the wire block assembly 300 is fixedly assembled with the mounting bracket 300 by the ribs 332.

The ribs 332 provided with the wire-assembling hole 335 support the wire 305. Even though FIGS. 3A and 3B illustrate many ribs arranged on the mounting bracket, the scope of the invention is not to be limited to the illustrated ribs, and instead, two or three ribs may be formed in consideration of several factors (e.g. weight reduction of the mounting bracket, manufacturing cost reduction of a wire-assembling hole, etc.). Moreover, in some cases, the mounting bracket 330 may include integrally-formed ribs.

Also, the mounting bracket 330 is provided with side rails 339, each of which has a semicircular sectional shape and is formed on an inner surface of the mounting bracket 330 to which the wire block assembly 300 is coupled. Therefore, when a vehicle crashes against an object, the wire 305 is deformed and straightly spread along the side rails 339.

That is, when a vehicle crashes against an object, the block 310 fixed to the plate bracket 320 is pushed in the collapse direction. Then, the wire 305 that is integrally connected along the side groove of the block and the side rail 339 of the mounting bracket formed in the same direction as the collapse direction is pulled in the collapse direction by the block 310 being pushed. Then, the bent holding portion of the wire is straightly deformed while absorbing the collision energy.

Figure 4A:
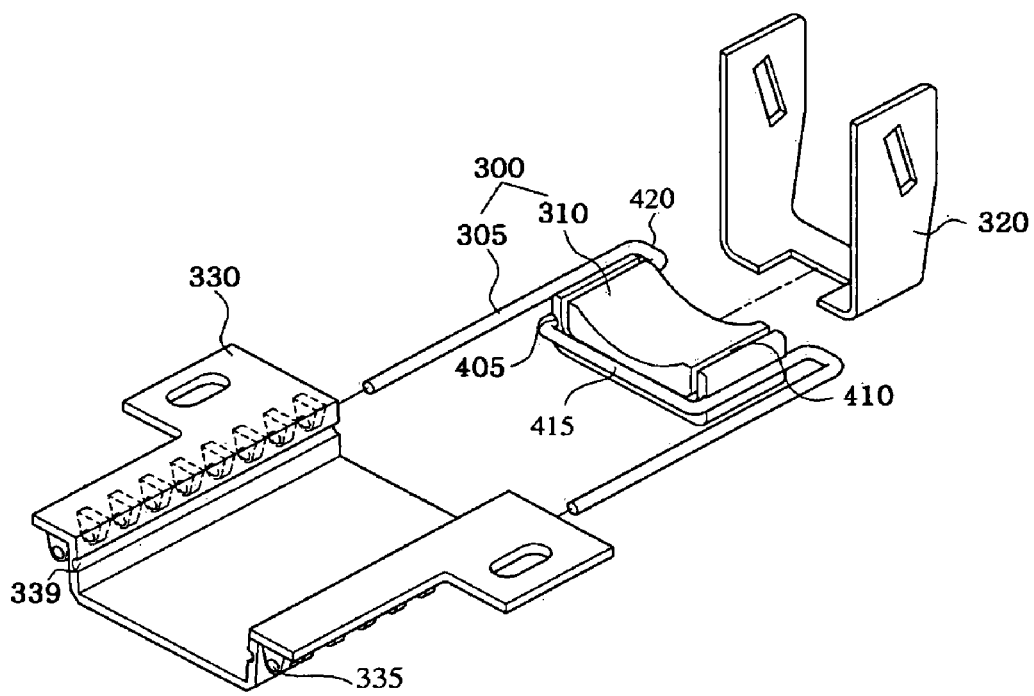
FIG. 4A is an exploded perspective view of the wire block assembly according to the embodiment of the present invention.
Figure 4B:
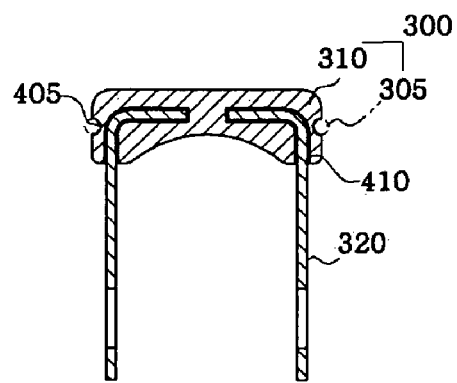
FIG. 4B is a sectional view of the wire block assembly according to the embodiment of the present invention.

FIG. 4A is an exploded perspective view of the wire block assembly according to the embodiment of the present invention, and FIG. 4B is a sectional view of the wire block assembly according to the embodiment of the present invention.

As shown in FIGS. 4A and 4B, the wire block assembly 300 according to the present invention includes a block 310 and at least one wire 305. The block 310 has side grooves 405 for seating the wire 305 and a guide groove 410 for assembling the plate bracket 320. Specifically, at least one side groove 405 is formed on each side surface of the block 310. The plate bracket is fitted in the guide groove 410 so that it is assembled with the block 310. The wire 305 has a fixing portion 415 and a holding portion 420, is seated in the side groove 405 of the block 310, and is inserted in the wire-assembling hole 335 of the mounting bracket 330. The wire 305 absorbs collision energy through deformation when a vehicle crashes against an object.

As shown in the drawings, the wire 305 of the present invention absorbs the collision energy of the vehicle while being straightened. However, the wire 305 is required to bear an initial load below a predetermined threshold (the load generated in the collapse direction during usual operation of the steering wheel, other than the load generated due to the collision of the vehicle) without being deformed. Therefore, the wire 305 has the U-shaped holding portion 420 in order to support the predetermined load before the deformation. After the wire block assembly is assembled with the mounting bracket, the U-shaped holding portion 420 prevents the wire from being pushed into the mounting bracket and helps the assembling between the wire block assembly and the mounting bracket.

It is preferred that the wire has a circular sectional shape. However, the wire may have various sectional shapes, such as an oval shape, a square shape, etc., according to conditions, such as an initial load, parts cost, assemblability, etc.

The wire 305 has a U-shaped fixing portion 415 seated in the side groove of the block 310 and a U-shaped holding portion 420 connected to both ends of the fixing portion and inserted into the wire-assembling hole of the mounting bracket. When the block 310 moves in the collapse direction due to the crashing of the vehicle, the holding portion 420 of the wire 305 is deformed and grows straightly spread while absorbing the collision energy. At this time, by controlling the thickness of the wire 305, it is possible to control the initial load and the amount of collision energy absorbed during the collapse of the column. Therefore, it is possible to achieve cost reduction through easy control of the initial load.

The block 310 according to the present invention has side grooves 405 for seating the wire 350 and L-shaped guide grooves 410 for holding the plate bracket 320. The side grooves 405 are formed on both side surfaces of the block, and the guide grooves 410 are formed inside of both side surfaces of the block. Each of the side grooves has a semicircular sectional shape. That is, the wire 305 is seated in the side grooves 405 formed on both side surfaces of the block and is then inserted through the wire-assembling holes 335 of the mounting bracket. Then, L-shaped flange portions of the plate bracket are pushed into the guide grooves 410 of the block, so that the plate bracket is assembled with the block (the coupled state is shown in FIG. 3A).

Unlike the conventional tearing plate (indicated by reference numeral 170 in FIG. 1) that is deformed while being perpendicularly torn, a steering column according to the present invention employs a wire, which is guided along the side grooves 405 of the block and the side rails 339 of the mounting bracket while being deformed in a direction parallel to the impact transfer direction to become a straight wire. Therefore, it is possible to reduce biased deformation or biased damage due to interference between a deformed part and surrounding objects.

Although it is assumed in the above description and the drawings that a steering column according to the present invention employs only one wire, the assumption is only for convenience of illustration and description and the scope of the invention is not to be limited by the above embodiments. In some cases, a steering column according to the present invention may employ more than one wire and thus may employ more than one wire-assembling hole and more than one side rail formed on a mounting bracket, more than one side groove formed on the block.

As described above, a collision energy absorbable steering column of a vehicle according to the present invention can absorb the collision energy by wire deformation when the vehicle crashes against an object, and can easily control an initial load through adjustment of the wire thickness, which results in reduction of cost. Moreover, in a collision energy absorbable steering column of a vehicle according to the present invention, the deformation occurs in a direction parallel to the impact transfer direction, so as to reduce biased deformation or biased damage due to interference between a deformed part and surrounding objects.

Although an exemplary embodiment of the present invention has been described for illustrative purposes, those skilled in the art will appreciate that various modifications, additions and substitutions are possible, without departing from the scope and spirit of the invention as disclosed in the accompanying claims.

Accordingly, the embodiment disclosed in the present invention is not for limitation of a technical idea of the present invention, but is for description of the technical idea. The scope of all technical idea of the present invention is not to be limited by the above embodiment.

What is claimed is:

1. A collision energy absorbable steering column of a vehicle comprising:
    a steering shaft having an upper end connected to a steering wheel and a lower end connected to a rack-pinion mechanism;
    an interior tube for surrounding the steering shaft;
    an exterior tube for surrounding the interior tube;
    a wire block assembly fixed to a mounting bracket so as to absorb collision energy by wire deformation when a vehicle crashes against an object;
    a mounting bracket for supporting the exterior tube, the mounting bracket being fixed to a chassis of the vehicle, the mounting bracket having at least one side rail and at least one wire-assembling hole through which a wire is inserted so as to assemble the mounting bracket with the wire block assembly; and
    a plate bracket coupled to the mounting bracket by forcibly fitting the plate bracket together with the wire block assembly in the mounting bracket.

2. The collision energy absorbable steering column as claimed in claim 1, wherein the wire block assembly comprises:
    a block having at least one side groove formed on each of side surfaces of the block so as to seat the wire, and at least one guide groove in which the plate bracket is fitted; and
    at least one wire seated in the side groove, the wire having a fixing portion and a holding portion, being inserted through the wire-assembling hole of the mounting bracket, and absorbing collision energy through deformation when a vehicle crashes against an object.

* * * * *